United States Patent
Bachman et al.

[19]

[11] Patent Number: 6,134,833
[45] Date of Patent: Oct. 24, 2000

[54] SELF-WATERING PLANT CONTAINER

[75] Inventors: Lynn C. Bachman, Los Altos; Pinal V. Mehta, Mountain View, both of Calif.

[73] Assignee: Planter Technology

[21] Appl. No.: 09/138,829

[22] Filed: Aug. 24, 1998

[51] Int. Cl.[7] .................................................. A01G 25/00
[52] U.S. Cl. ........................................ 47/80; 47/79; 47/81
[58] Field of Search .................................. 47/79, 80, 81, 47/66.1

[56] References Cited

U.S. PATENT DOCUMENTS

| | | |
|---|---|---|
| 3,192,665 | 7/1965 | Cloud . |
| 3,753,315 | 8/1973 | Adam . |
| 3,758,987 | 9/1973 | Crane, Jr. . |
| 3,775,904 | 12/1973 | Peters . |
| 3,783,555 | 1/1974 | Peters . |
| 3,903,644 | 9/1975 | Swift et al. . |
| 4,040,207 | 8/1977 | Lancaster . |
| 4,329,815 | 5/1982 | Secrest . |
| 4,745,707 | 5/1988 | Newby . |
| 4,756,121 | 7/1988 | Wild . |
| 4,858,381 | 8/1989 | Walton et al. . |
| 4,885,870 | 12/1989 | Fong . |
| 4,991,346 | 2/1991 | Costa, Jr. et al. . |
| 5,383,943 | 1/1995 | Ogawa et al. . |
| 5,491,928 | 2/1996 | Potochnik . |
| 5,860,249 | 1/1999 | Holtkamp, Jr. . |

FOREIGN PATENT DOCUMENTS 2141201  10/1972  Germany .

*Primary Examiner*—Michael J. Carone
*Assistant Examiner*—Fredrick T. French, III
*Attorney, Agent, or Firm*—Ron Fish; Falk & Fish

[57] ABSTRACT

A self-regulating, automatic watering planter comprised of an inner shell and outer shell with a snap-fit engagement to form a reservoir for water between the walls of the inner and outer shells. The inner shell has small holes in the bottom thereof to allow water to enter soil contained in the inner shell. An airtight seal between the inner and outer shells creates a vacuum at the top of the reservoir as the water seeps through the holes and the water level drops. The water in the walls provides hydrostatic pressure that drives the water through the inlet holes. The water stops when the vacuum reaches a sufficient level to counteract the hydrostatic pressure. An air tube coupled to the air space on top of the reservoir and having a hydrophilic polyethylene sensor blocking one end is buried in the soil. The hydrophilic sensor blocks air flow into the air space when there is sufficient water in the soil, but when the soil is dry, the hydrophilic sensor lets air into the air space thereby lowering the vacuum level. This allows more water to enter the soil until the vacuum level again reaches a level to counteract the hydrostatic pressure.

22 Claims, 7 Drawing Sheets

TOP EDGE OF ONE PIECE PLANTER FORMED BY ROTATIONAL MOLDING

SELF-WATERING PLANT CONTAINER

BACKGROUND ART AND COMPARISON WITH THE INVENTION

The invention is useful in the field of plant containers that automatically water the plants growing therein with just enough water, the amount of water being self-regulated by the degree of dryness near the rootball of the plant by a hydrophilic sensor.

The urban and suburban nature of modern living has led to a proliferation in the use of potted plants as decorative items. Living potted plants are commonly found in private homes, restaurants, hotels, office buildings and many other locations. Consequently, devices for containing and caring for potted plants have become a major commodity.

One of the most desirable types of potted plant devices available is the self watering planter. Self watering planters are devices containing relatively large water or fluid reservoirs which may be periodically filled and which then dispense the water to the plant as the plant requires it. Self watering planters have been devised to operate by way of timer systems or by way of constant low volume seepage into the soil surrounding the plant. One of the most effective self watering planters, however, is the type wherein a sensor is placed within the soil of the plant to sense the level of moisture in the soil and cause additional water to be delivered to the soil if the moisture level is too low. Sensing self watering planters of this type have utilized electrical sensing units, an expensive and possibly dangerous solution, and porous hydrophilic (water loving) sensors.

In the discussion which follows there is described a self-regulated automatic watering planter described in a U.S. Pat. No. (4,329,815) which is believed by the applicants to be the closest prior art. This planter uses a porous hydrophilic sensor to provide automatic watering by sensing the water content in the soil.

Porous hyrophilic sensing devices allow air to pass through the porous material when it is dry but prohibit the passage of air when the porous material is wet. The porous sensor is connected to an air-tight water reservoir such that when the sensor is blocked by water, atmospheric pressure cannot reach the water reservoir and vacuum pressure prevents the delivery of water to the soil of the plant.

The invention claimed herein is an improvement on this technology using the same principle of operation but improved structure. Since the easiest and clearest way to define the genus of self-regulating, automatic watering planters which the claims are intended to cover is by comparison and contrast with the planter described in U.S. Pat. No. 4,329,815, the background art and summary of the invention sections have been combined into one section for purposes of this patent application.

U.S. Pat. No. 4,329,815 to Secrest, filed Nov. 7, 1980, which is hereby incorporated by reference, represents the predecessor product to the invention described herein and works on the same scientific principles as the invention. The term "self-regulated automatic watering planter" as used in the claims means a self watering planter identical in principal in operation to the planter defined in U.S. Pat. No. 4,329,815 but not needing absolutely every physical characteristic of the planter described in that patent. The features which are not necessary to be included in a claimed structure using the term "self-regulated automatic watering planter" will be specifically identified in the below given discussion of the structure of the planter defined in the '815 patent.

The '815 patent teaches a plant container having an outer shell 14 and an inner shell 12 with substantially vertical walls (vertical walls are not required in the claimed planters where the claim uses the term "self-regulated automatic watering planter") which are concentric and which are sized so as to form a concentric water reservoir which is sealed against the atmosphere. In the '815 patent planter, the outer and inner shell are welded together at the top to form a composite structure. This is done by welding a rim 15 which projects outward from the top of the wall formed by the inner shell 12 to the top edge of the wall of the outer shell 14. In the planters claimed herein using the phrase "self-regulated automatic watering planter", welding of the inner shell and outer shell together at the top is not necessary. The inner shell has a ridge at the top of its wall which extends outward toward the top of the outer shell wall. The underside of the ridge has two downward extending ridges which are spaced apart and which have inner walls with grooves or detents formed therein. The top of the wall of the outer shell has two beads formed on the outer and inner surface at the top of the wall. The top of the wall of the outer shell snaps into the space between the two downward extending ridges when the beads engage the groove or detents. In some species this snap fit is tight enough to be airtight. if the snap fit is adequately tight to make an airtight seal at the top of the reservoir, no further welding or sealing is necessary. However, if the snap fit is not tight enough to make an airtight fit, the seam between the inner and outer shell must be sealed so as to be airtight since an airtight seal is necessary to the proper operation of the invention. In the preferred species, this is accomplished with a bead of glue.

In planters in the genus of the invention, the inner shell and outer shell do not need to be welded together to form a mechanical bond as that mechanical connection is formed by a snap fit which will be described in greater detail in the detailed description of the invention section. However, as noted above, there must be an airtight seal.

In the '815 patent planter, the water is stored in both the space between the walls of the inner and outer shells and in the space between a "substantially flat" bottom wall supporting the soil in the planter and a second bottom wall comprising part of the outer shell. In any claimed invention herein where the phrase "self-regulated automatic watering planter" is used, it is not necessary that the walls be concentric or round or that the water be stored all the way around the circumference of the planter or that the bottom wall be substantially flat. In fact, in the preferred embodiment of the invention, the bottom wall is flat on the outside perimeter but has a circular well centered therein wherein the bottom wall of the well has the holes which allow passage of water from the reservoir into the soil. Unlike the inlet port in the '815 patent which is plugged by an inlet filter, the inlet ports in the "self-regulated automatic watering planter" do not use inlet filters at all and have a shape like an inverted funnel so as to provide a venturi effect. The venturi effect converts the pressure of the water entering the wide mouth of the opening into higher velocity as the water goes through the more narrow mouth of the opening leading to the soil. This acceleration of the water helps the keep the holes unplugged and eliminates the need for a filter.

It is necessary in all species within the genus of self-regulating, automatic watering planters claimed herein that the water reservoir have some height so as provide some hydrostatic head pressure to drive the water up through the passageways in the bottom of the well when the hydrophilic sensor is dry, and it is necessary that the tube connected to the hydrophilic sensor be coupled into the air space at the top of the reservoir so as to selectively couple and decouple atmospheric pressure to the air space above the water, i.e., the hydrophilic sensor acts as a valve between the atmosphere and the vacuum space above the water level in the reservoir. The hydrophilic sensor valve is open when the sensor material is dry and closed when it is wet. It is also desirable to either locate the air tube opening above the level of the fill tube opening to prevent backflow of water into the air tube or use any other means such a filter impermeable to water but permeable to air at the inlet of the air tube to prevent it from being filled with water. The '815 patent teaches use of heat shrink tubing to couple the air tube to the sensor, but in the genus of the invention this method as well as other methods such a glue or tight interference fits may also be used so long as the permeability to air is not affected.

In the '815 patent planter, a niche in the ridge at the top of the inner shell's ridge is formed to make a spot for the fluid fill port. In the genus of the invention, the niche is not necessary, and it is only necessary that there be a fill port which can be used to fill the reservoir and which can be plugged by a stopper to be airtight. In alternative embodiments, the fill port may be a valved port.

In the '815 patent planter, there are passageways at the bottom of the reservoir which lead to the soil in the container through an input filter. The input filter is comprised of a porous hydrophilic material. The input filter acts as a baffle to slow the flow of water into the soil when the vacuum is broken (atmospheric pressure is coupled to vacuum space above water level in reservoir). This filter had a tendency to clog up about every 4–5 years with silt and cause the planter of the '815 patent to cease functioning because the water could not pass the inlet filter. The filter had to be replaced which required that the entire plant had to be removed to gain access and change the filter. While this was not a big job, it was inconvenient and could also cause plants to die if the attendant did not notice within a reasonable time that the planter was no longer automatically watering. In planters claimed herein using the phrase "self-regulated automatic watering planter", this input filter is not included in the structure intended to be indicated by that phrase.

In the '815 patent planter, the inlet port is surrounded by a broken annular ridge 26 which was raised above the bottom wall or floor 18. The broken annular ridge was inside a concentric annular ridge 28 which is higher. Neither of these ridges is included within the planter indicated by the phrase "self-regulated automatic watering planter" used in the claims.

The top of the reservoir in the '815 patent planter is coupled to a hydrophillic sensor 37. This sensor is coupled in an airtight fashion to the airspace at the top of the reservoir by a tube in the form of a hollow, flexible plastic tube. This tube has the sensor blocking one end, and is long enough to extend from an airtight port at the top of the reservoir into which the tube is inserted to a location somewhere beneath the top surface of the soil in the container, preferably about ⅓ of the way down the rootball. The sensor is a hydrophilic material. It is impermeable to air when moist. When there is enough water in the soil, the sensor absorbs moisture, preventing air from passing through the sensor thereby sealing the reservoir off from the atmosphere. When the top of the reservoir is sealed to the atmosphere, water in the reservoir will wick into the soil only to the extent that the drop in the water level in the reservoir creates a vacuum of sufficient level to prevent further water from entering the soil.

As the soil drys out from evaporation, the hydrophilic sensor material drys out as well and becomes porous enough to allow air to pass therethrough. When this happens, the vacuum is dissipated enough to let further water move by hydrostatic pressure and capillary action into the soil through the inlet filter to replace the evaporated water. The soil then becomes moist thereby causing the hydrophilic material to absorb moisture and become impermeable to air again thereby sealing the reservoir off from the atmosphere. The water continues to move into the soil until the water level drops enough in the reservoir to again create sufficient vacuum to prevent further water from moving into the soil. This cycle repeats itself every time the soil becomes dry enough for the hydrophilic material to allow air to pass therethrough. In the genus of the invention, the same type of hydrophilic sensor self-regulation is used, and the sensor of the '815 patent may be used. The '815 patent uses a hydrophilic sensor of sintered polyethylene which has been coated with a surfactant that makes it hydrophilic. The preferred average pore size of the polyethylene material is 20–30 microns. The sintering is conducted after the surfactant is applied to the polyethylene to create the desired pore size but the sintering also results in the surfactant staying on the polyethylene longer.

The '815 patent planter teaches radial baffle fins 48 extending outward from the center of the bottom portion of the outer shell and a slope-sided nipple element 50. These baffles and nipple element serve to prevent fouling of inlet filter by impeding progress of floating debris in the reservoir toward the inlet filter. The '815 patented planter also teaches a floating debris guard 52 in the form of an annular ring which restricts floating debris from reaching the inlet port. None of these baffle, nipple or floating debris guard elements is required in the "self-regulated automatic watering planters" of the genus of the invention although they can be used in some species. The preferred species uses a well in the bottom of the inner shell the bottom of which very closely approaches the upper surface of a flat bottom wall of the outer shell. While the distance between the bottom of the well and the flat bottom wall of the outer shell is sufficient to let water pass, larger floating objects are impeded from reaching the inlet holes by the narrow passageway.

The '815 patent also teaches a root barrier structure which is described in the following way:

> In the device 10, it may be noted that the inlet filter 22 and washer 24 are recessed downward from the bottom surface 18 of bowl 16 in inlet port 20. Situated directly above the inlet port 20 is the thin circular disk 30 which rests upon broken annular ridge 26. The thickness of disk 30 combined with the depth of broken annular ridge 26 is approximately equal to the depth of solid annular ridge 28. Thus, the upper surface of disk 30 is level with the upper surface of solid ridge 28. The exterior edge of disk 30 extends almost to the interior edge of solid ridge 28 to form therebetween an annular fluid aperture 54. Annular fluid aperture 54 provides the route by which water or other fluid is delivered to the interior of bowl 16 and consequently to the plant.

Basically, this root barrier is a thin disk resting on top of the broken ring and having a diameter just a little smaller than the diameter of the solid annular ridge 28. This provides a path for water travelling upward but not enough space for roots travelling downward toward the inlet filter so as to be able to clog it. This exact root barrier structure from the '815 patent is not necessary in the genus of the invention, but another root barrier is used in the preferrred species. This new root barrier structure is comprised of a patch of Bioguard™ root barrier fabric placed over the inlet holes. This root barrier fabric has time release nodules of nonwater soluble herbicide attached to the fibers of the fabric. The herbicide stays near the fabric and is not carried by the water up to the root ball. Any roots that get close to the inlet holes are suppressed by the herbicide.

A self watering planter using a porous hydrophilic sensor is described in U.S. Pat. No. 3,758,987 issued to W. Crane, Jr. The Crane patent discloses a self watering planter having the inlet port to the soil located at the center of the bottom interior of the planter. In a device of this construction, the water enters the soil from the bottom while the sensor measures the moisture content of the soil near the top. When the moisture level at the sensor element is sufficiently high to block the pores such that air may no longer flow through the sensor element, the water flow into the soil is stopped.

Another type of self-watering plant container is available in the prior art. These types of containers are commercially available from Jardinier of Costa Mesa, Calif. This second type is a wicking type container with no self-regulating feature. These type planters are simply pots with holes in the bottom which lead to a water reservoir below. The water reservoir is not sealed to the atmosphere and there is no hollow flexible tube which extends from a port in the reservoir into the soil with the end thereof blocked by a plug of hydrophilic material. These types of containers therefore allow water to wick into the soil at whatever rate the soil will absorb the water and the degree of water saturation in the soil is solely a function of the water absorption capability of the soil and not a function of how much water the plant needs.

In contrast, the self-regulating, self watering type containers meter the amount of water that goes into the soil by virtue of the pore size of the hydrophilic material. Typically, pore sizes of 30 microns have been found to work satisfactorily to control the amount of water that gets into the soil to a healthy amount for the plant.

The advantages of these self-regulating, self-watering planters are several. First, they take away the need for botanically sophisticated technicians who are able to decide how much water a plant needs and visit the plant often enough to make sure its soil's water content is just right. Second, they reduce the cost of plant losses to plant maintenance and client companies which use them since fewer plants die from too much or too little water.

These type of self-watering plant containers are favored by plant maintenance companies. Typically, industrial companies contract with plant maintenance companies to take care of plants in the buildings of the company. The plant maintenance companies may sell the plants and containers to the client companies or lease them. Frequently, decorative planters are used which are simply for aesthetic appeal with the actual plants being contained in plastic planters that fit within the decorative planters.

The assignee of the present invention offers decorative planters that have built in self-regulating, automatic-watering capabilities. However, these decorative planters are more expensive than decorative planters without self-regulating, automatic-watering capabilities. The higher price of the prior art self-regulating, automatic-watering planters such as are taught in the '815 patent chills sales when competing with the cheaper continuous watering planters with no hydrophilic sensor technology.

Further, the continuous watering planters with no hydrophilic sensor technology have thinner walls since most or all of the water in the reservoir is stored beneath the floor of the inner shell. As such, they fit well into existing decorative planters which have dimensions designed to fit these planters. In contrast, the planters taught in the '815 patent have dimensions which do not fit in decorative planters already in the hands of plant maintenance companies.

When client companies or plant maintenance companies already have decorative planters, it is difficult to sell them decorative planters with self-regulating, self-watering capabilities that do not fit within their existing decorative planters since the client is hesitant to scrap perfectly good decorative planters.

When client companies or plant maintenance companies do not already have decorative planters, they prefer to buy a combination of decorative planter and and self-regulating, automatic watering planter that fits perfectly in the decorative planter and which is priced competitively with self watering planters which are not self-regulated.

Therefore, a need has arisen for a self-regulating, automatic watering planter which is cheaper to build and at least some species of which can fit properly in existing decorative planters.

SUMMARY: DEFINITION OF THE GENUS OF THE INVENTION AND DISTINGUISHING CHARACTERISTICS OF IMPORTANT SPECIES WITHIN THE GENUS

The genus of the invention is defined by the following characteristics that all species will share. The two principal characteristics shared by all species are that they are "self-regulated automatic watering planters" (as that phrase is defined above) which operate in accordance with the same principle of operation as taught in U.S. Pat. No. 4,329,815 but which have snap-together construction to reduce the construction costs for each planter. The snap-together construction gives mechanical strength to the joint between the inner and outer shell which was formerly provided by an expensive structural glue in the planter of the '815 patent. In the preferred species, a bead of glue or other sealant is provided at the joint between the inner and outer shell to insure an airtight joint. Since this glue does not have to provide structural integrity, it can be a less expensive material than the glue used in the '815 patent. The snap-together construction greatly reduces the time to assemble a completed planter thereby reducing manufacturing costs.

In an entirely separate genus, the entire reservoir is formed as a single piece through appropriate molding processes.

Some species within the genus of the invention use the inlet port and hydrophobic filter arrangement taught in the '815 patent in combination with the snap-together construction. However, preferred species within the genus of the invention utilize venturi-effect inlet ports without the use of a porous hydrophobic inlet filter which can be clogged with silt and require replacement. These venturi-effect inlet holes are shaped like inverted funnels with the narrow mouth closest to the soil. The lower piece count reduces the cost of the planter and makes them easier to maintain since there is no inlet filter to clog up thereby requiring removal of the plant and replacement of the filter.

The preferred species within the genus uses a smaller reservoir thickness in the walls (the amount of space between the inner and outer shells in the walls of the round reservoir). This allows this species to fit within a decorative planter, and the lower cost of the snap-together construction lowers the overall cost of the combination.

The self-regulating watering feature gives an advantage to a plant maintenance company in that they may use lower skill technicians in their labor force since the more complicated work regarding investigation into whether the plant is getting enough water, whether to water a plant lightly or soak it heavily etc. are removed from the equation. All the technician needs to do is make sure the reservoir has sufficient water in it and change the sensor every 4–5 years. Of course, if the species uses an inlet filter, the filter must be changed every 4–5 years also, but the preferred species eliminates the filter. By eliminating the filter below the soil at the bottom of the planter, the number of replaceable parts is lowered and the only part that does need to be replaced, i.e., the sensor, is much more accessible.

The self-regulating automatic watering planter also has the advantage that more water can be put in the reservoir than in the continuous watering prior art type planters. This is because in the continuous watering prior art planters, more water would cause the soil to become saturated for a longer period of time, increasing plant mortality. With the hydrophillic sensor, this can never happen regardless of how much water is put in the reservoir since the sensor cuts off the water flow when the soil has soaked up enough water for good plant health.

DETAILED DESCRIPTION OF THE PREFERRED AND ALTERNATIVE EMBODIMENTS

Figure 1:
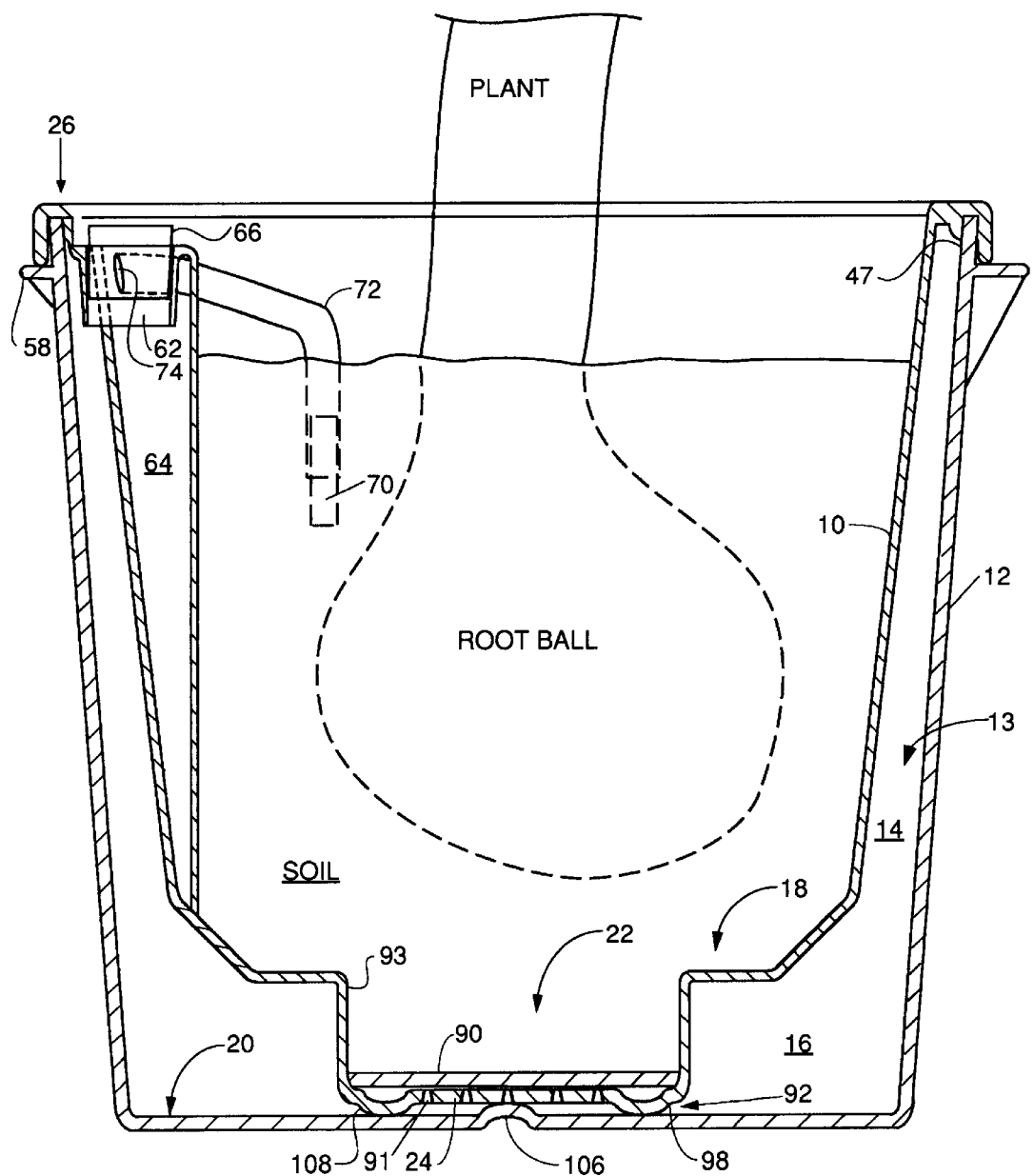
FIG. 1 is a cross-sectional view of the preferred species in the "self-regulated automatic watering planter" within the snap-together construction genus.
Figure 7:
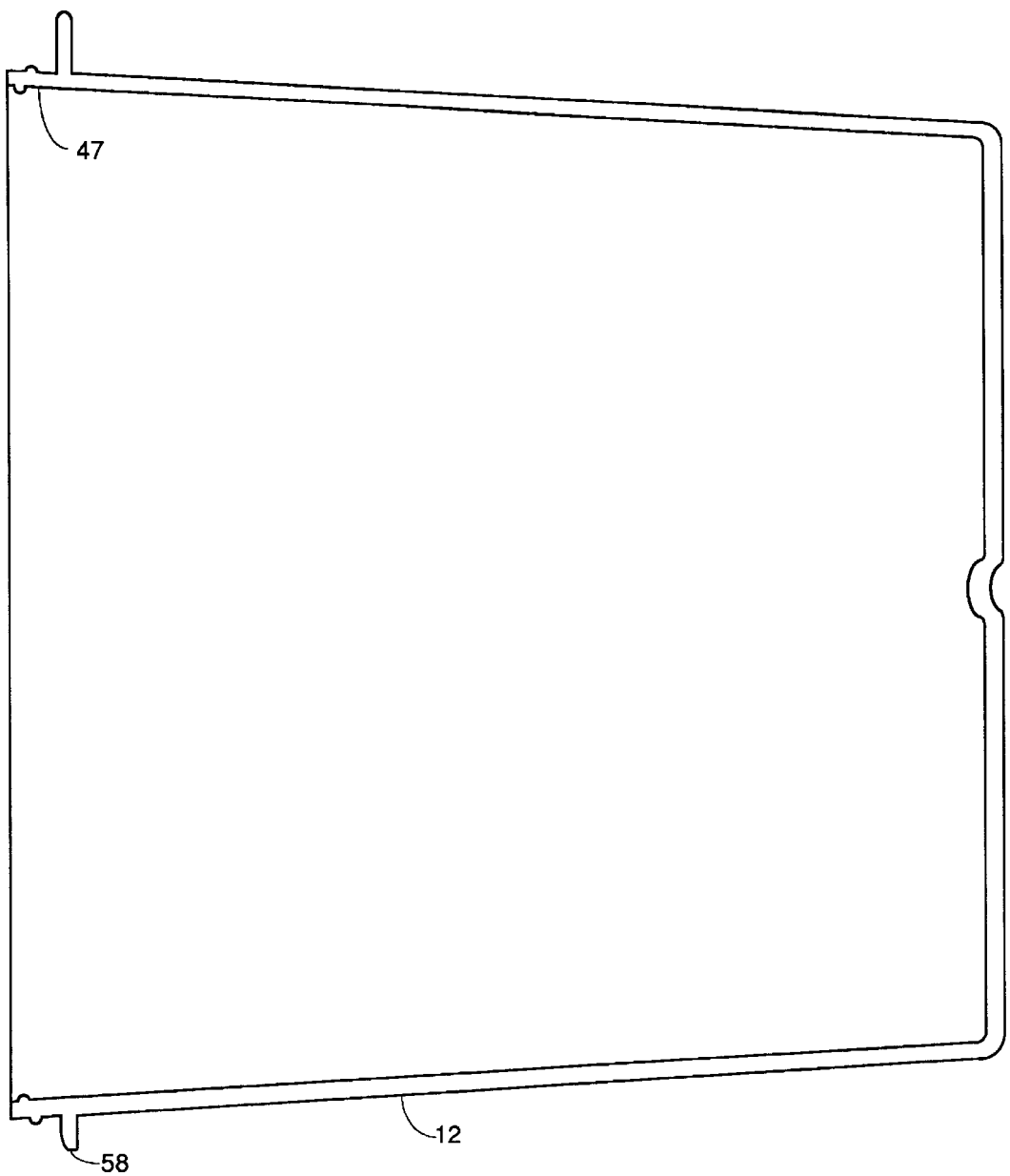
FIG. 7 is a cross-sectional view of the outer shell of the two-piece, snap-together type reservoir.

Referring to FIG. 1, there is shown a cross-sectional drawing through the middle of the preferred species of the "self-regulated automatic watering planter" within the snap-together construction genus. The planter is comprised of an inner shell 10 (FIG. 4) that snaps together with an outer shell 12 (FIG. 7) to define a water reservoir 13 between the walls of the inner and outer shells. The inner shell has a well defined by sidewall 93 at the bottom thereof with the well having a bottom floor 98 in which a plurality of filter-less water inlet holes such as 91 are located. The water reservoir which has a vertical component 14 between the upstanding walls of the planter and a horizontal component 16 between the bottom floor 18 of the inner shell and the bottom floor 20 of the outer shell.

Figure 2:
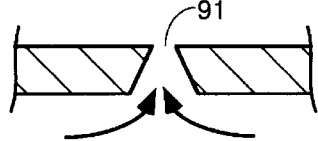
FIG. 2 is a cross-sectional view of one of the plurality of filterless inlet holes located in the bottom of the well in the inner shell in the preferred species.
Figure 3:
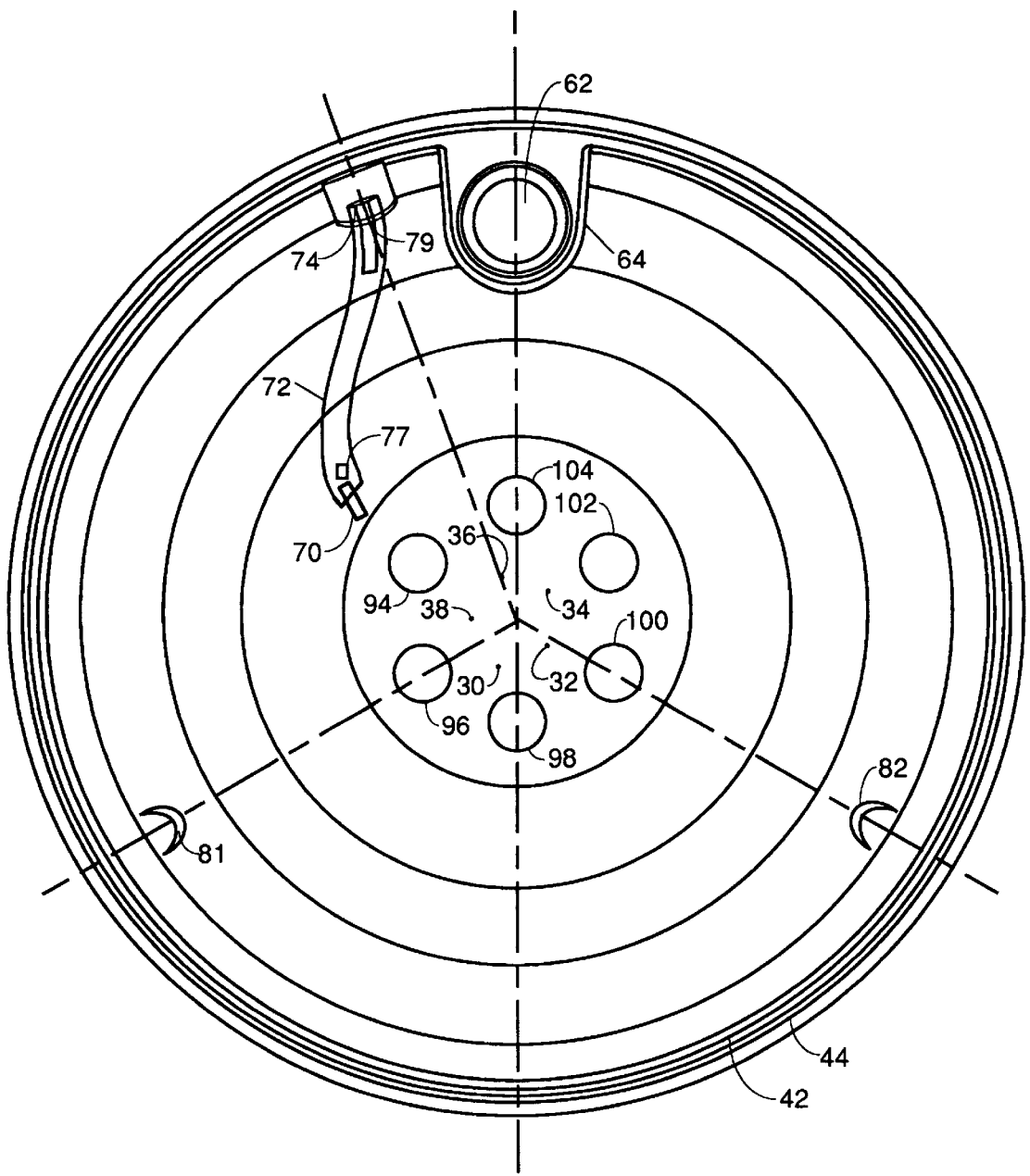
FIG. 3 shows a top view of the inner shell.

The inner shell has a well 22 which has a bottom floor 24. This well is not necessary and a flat bottom with inlet holes can be substituted, but the presence of the well provides more water storage space in the bottom of the planter. In the bottom floor 24 of the well, there are five holes of which hole 91 is typical which have a diameter of 0.015 inches at the narrowest point through which water from the reservoir enters soil in the planter (not shown). FIG. 3 shows a top view of the inner shell. The inlet holes are shown at 30, 32, 34, 36 and 38. FIG. 2 is a cross-sectional view of one of the plurality of filterless inlet holes 91 (also shown in FIG. 1 in bottom floor 24) located in the bottom of the well in the inner shell in the preferred species. Each of the inlet holes has a venturi-like shape as shown in cross-section in FIG. 2. Water under hydrostatic pressure entering the hole from the bottom, as symbolized by the arrows, encounters a venturi effect as the cross sectional area of the channel narrows. This lowers the pressure and increases the speed. The faster movement of water provides a flushing action to help prevent clogging of the inlet holes with silt or other small particles. There are five inlet holes located in the bottom wall 24 of the well 22. In the preferred species, the size of these holes is 0.015 inches diameter at the narrowest point. This size has been selected because it is known to work and provide a flow of water into the soil which is approximately the same as the flow of water into the soil when the sensor is open as is provided by the '815 patent planter inlet filter. This size is not critical to the invention however and other sizes will probably also work. The general criteria by which to decide whether a hole size works are as follows. The hole size must be small enough that when the reservoir is filled and the stopper is not plugging fill hole 62, if the user walks away for a short time and comes back, the plant will not be overwatered. Generally, this criteria requires a fairly small hole so as to substantially restrict the flow of water into the soil while the stopper is out or the sensor is open. Once the stopper 66 is placed in the fill hole and the sensor 70 is operating to selectively gate water into the soil, the size of the hole is not critical so long as water can get into the soil. In other words, the amount of time it takes for the water to get to the sensor and shut it off from the time the sensor opened is not terribly critical since the plant is unlikely to die if the water takes two days to reach the sensor as opposed to 15 seconds. The overall criteria by which to judge whether the hole size is proper is whether or not the container overwaters during the process of filling the reservoir and whether or not the plant dies from too much or too little water during normal operation.

The length of the hydrophilic sensor material that is within the air tube defines the amount of vacuum that can be withstood. Bigger planters with higher vacuum levels should have more hydrophilic sensor material inside the tube.

Figure 4:
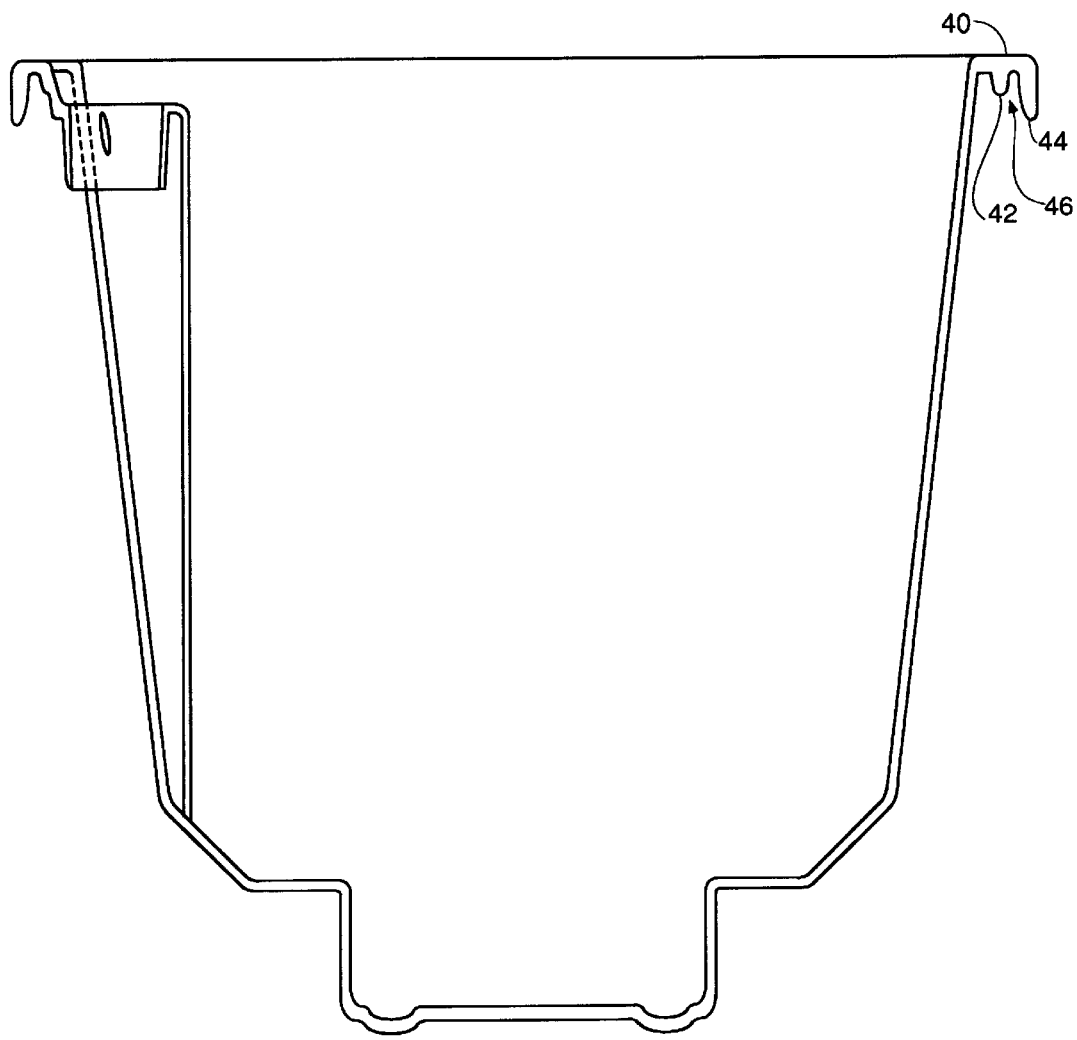
FIG. 4 is a cross-sectional view of the inner shell standing alone.
Figure 5:
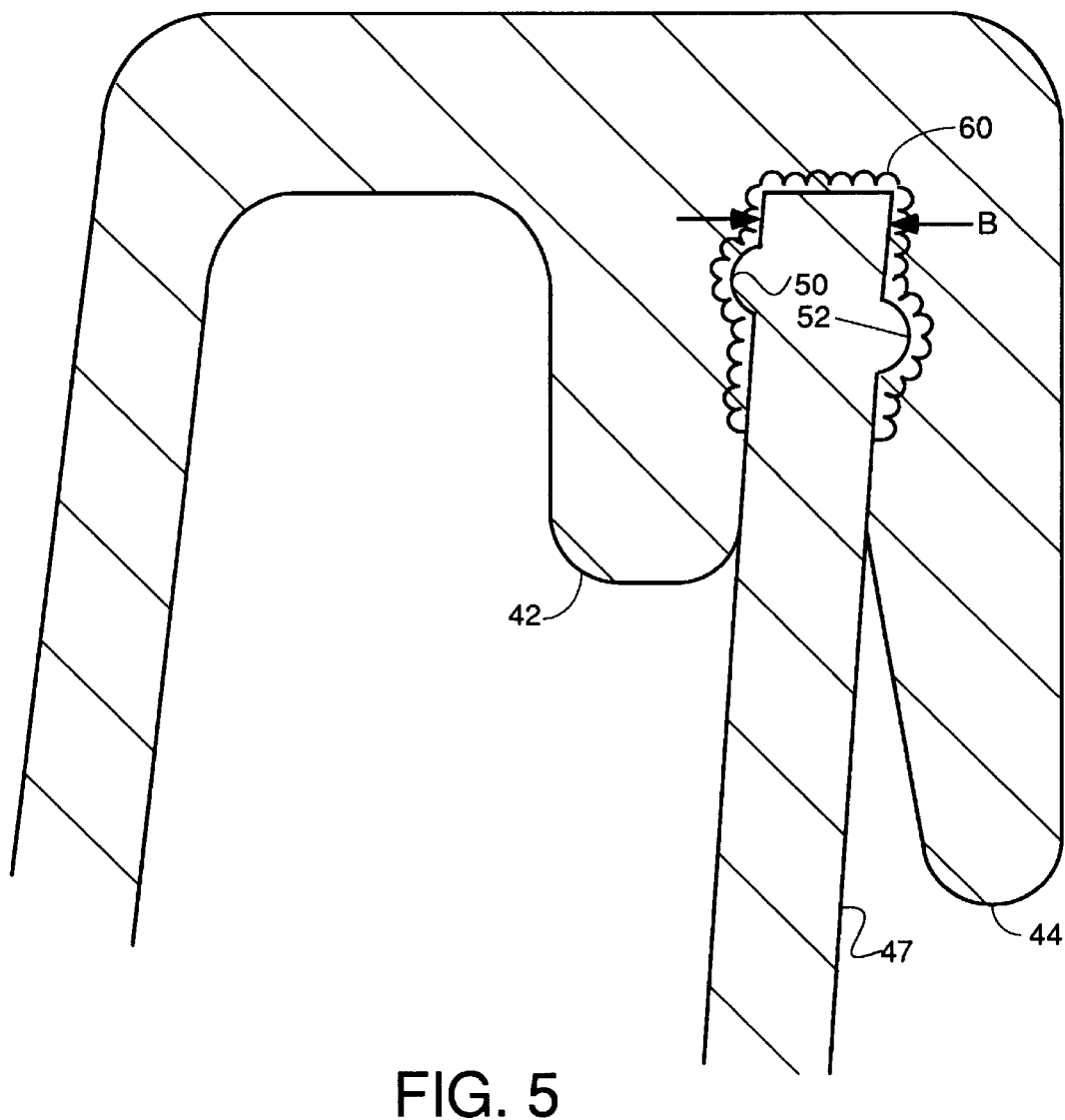
FIG. 5 is a close-up, cross-sectional view of these downward projecting annular ridges of the flange on the top edge of the inner shell as engaged with the upper edge of the outer shell.
Figure 6:
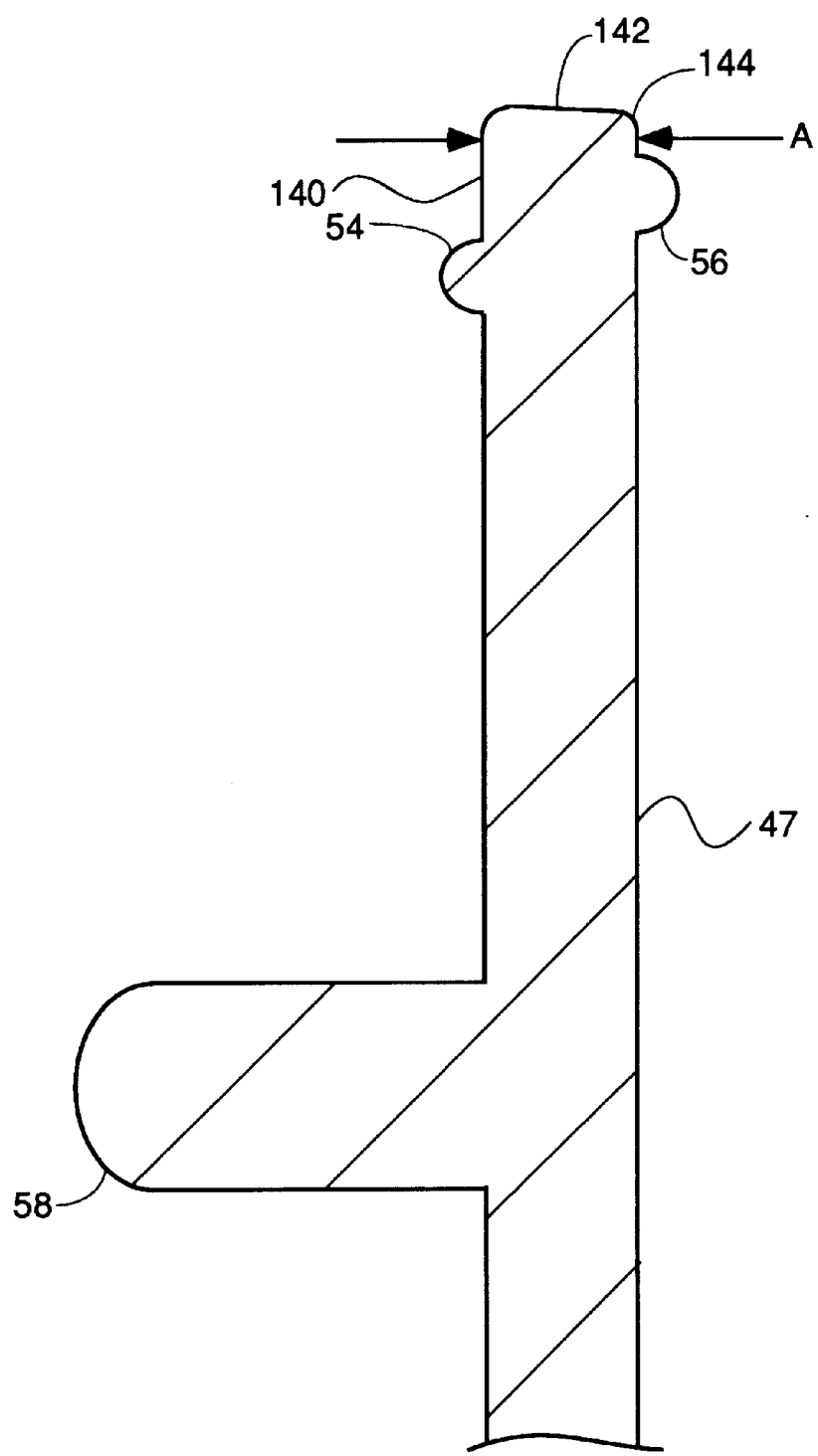
FIG. 6 is a zoomed-in view of just the upper edge of the outer shell.

Snap together construction is provided by the configuration of the upper edges of the inner and outer shell. The joint formed by the snap-together engagement is shown generally at 26. FIG. 4 is a cross-sectional drawing of the inner shell standing alone. The inner shell has a horizontally extending annular flange 40 which extends toward the position of the outer shell. The flange 40 has two downwardly extending annular projections 42 and 44 defining a gap 46 therebetween into which top edge 47 of the outer shell fits. The annular ridges or projections 42 and 44 are continuous in the preferred species, but they may be discontinuous in some species where the snap-fit is relied upon solely to provide mechanical strength and a sealing material is relied upon to provide an airtight joint. FIG. 5 is a close-up, cross-sectional view of these downward projecting annular ridges 42 and 44 of the flange on the top edge of the inner shell as engaged with the upper edge of the outer shell. The space between the downward projections 42 and 44 has two grooves 50 and 52 on the inner walls of the projections. These grooves are engaged with bumps 54 and 56 on the upper edge 47 of the outer shell wall to form a snap fit which provides mechanical strength and stability to the joint formed thereby. These bumps are best seen in FIG. 6 which a zoomed-in view of just the upper edge of the outer shell. Ideally, the dimension A in FIG. 6 defining the width of the top edge of the outer and B in FIG. 5 defining the width of the channel between downward projections 42 and 44 and the dimensions and placement of the annular bumps 54 and 56 relative to the annular grooves 50 and 52 are such that an airtight fit is formed with surfaces 140, 142 and 144 flush with corresponding surfaces in the channel. If the fit is not airtight, the automatic, self-regulating watering function will not work, and a bead of glue or other sealant 60 is interposed between the top edge of the outer and the channel portion of the inner shell to insure an airtight fit.

For purposes of the claims, the term "interference fit" defining the joint between the top edge of the outer shell and the channel formed by the space between the downward projections 42 and 44 means a fit which is tight enough for the joint formed thereby (regardless of the presence or absence of beads 54 and 56 and channels 50 and 52) to be airtight at pressures up to the maximum pressure which would be experienced in normal operation of the planter. Typical air pressure or vacuum levels usually do not exceed x inches of water where x is the height of the water column in the sidewalls. Airtight means that the joint will not leak over an extended period of time which is long enough to provide assurances that the plant will not flood out between servicing intervals. The acceptance criteria used by the assignee of the invention for determining whether the joint is sufficiently airtight is whether it can hold a vacuum of 25 inches of water for a period of 1 minute without a substantial drop in vacuum level.

An annular flange 58 projects outward away from the center of the planter and serves as a handle so that the planter can be picked up easily. The annular flange also serves as a shield to protect the snap-fit joint from impacts directed in an upward direction that would tend to degrade the integrity of the joint. The annular flange 58 helps prevent destruction of the airtight joint when the planter is repeatedly dropped into a decorative planter.

In some embodiments, the snap-fit engagement of the inner and outer shell is sufficiently airtight to eliminate the need for any additional sealant at the joint. It is necessary for proper operation that the joint between the inner and outer shells be airtight however. Therefore, in the preferred species, a bead of glue 60 is used at the joint to insure airtight fit. The snap-fit engagement provides the mechanical strength of the joint however, so the glue does not have to be the expensive structural glue that was used to construct the prior art '815 planter. In FIG. 5, the bead of glue is depicted as encompassing the top of the wall 47 in addition to the sides thereof down past the bumps 54 and 56. In some embodiments, the bead of glue 60 may be restricted to just the top of wall 47.

Referring again to FIGS. 1 and 3, the reservoir is filled by pouring water into a fill port 62. The water passes down through a passageway 64 formed as a semi-circular, funnel-like inward projection of the wall of the inner shell. The wall of the outer shell completes the passageway. The fill port 62 is larger than the fill port of the planter defined in the '815 patent. In the preferred species, the fill hole is located at a level below the rim of the inner and outer shells so as to make the stopper 66 less apparent and prevent overflow water from spilling out of the container.

The fill port is plugged in airtight fashion by a stopper 66 after filling the reservoir. In some embodiments, the stopper can be a pure rubber stopper, but in other embodiments, especially the larger size planters where more expensive plants are resident, the stopper has a hex screw-driven camming expansion mechanism in it such that its diameter can be expanded after insertion into the fill port to provide a snug, airtight fit. Because these stoppers require a hex key to loosen, they are much more tamper resistant than an ordinary rubber stopper. There has to be an airtight seal around the hex screw head or in some other locations in the camming mechanism so that air cannot get into the reservoir around the screw drive mechanism as an alternate pathway to the path between the stopper and the fill hole walls.

Figure 8:
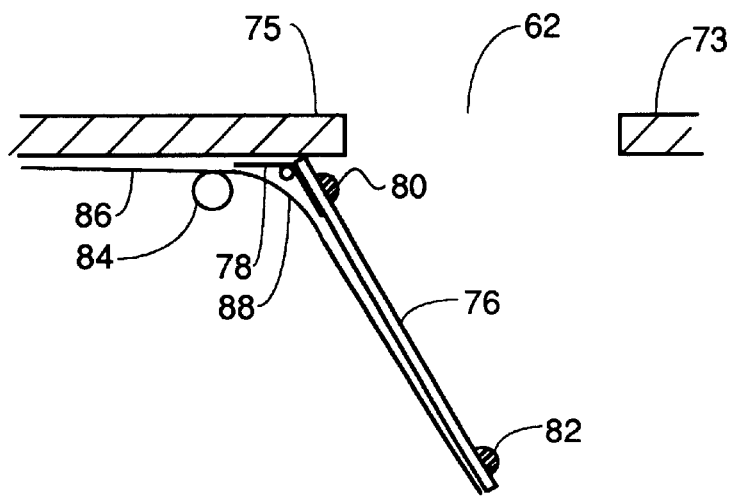
FIG. 8 is a drawing of a self-sealing door configuration using a spring biased door.

In alternative embodiments, an automatically sealing valve may be used to seal the fill opening. In such an embodiment, the nozzle of a fill hose, funnel or water container can be inserted into the valve to gain access to the reservoir for filling. After the nozzle is removed, the valve automatically seals the opening. Any known valve mechanism suitable for performing this function can be used. One structure for such a valve is shown in FIG. 8. There, the opening for the fill hole is shown at 62 surrounded by the top edge of the reservoir. A valve door 76 is mounted by hinge 78 to the undersurface of edge 75 rear the opening 62 such that the door can be swung open for filling and can be swung shut to close the opening. Flexible sealing material in the form of a ring around the door, shown in cross-section at 80 and 82, engages the underside of the top surface of the reservoir completely around the perimeter of the opening 62 to make an airtight seal. A powerful spring 84 has one extension 86 mounted to the underside of the top reservoir surface portion 75. Another extension 88 of the spring engages the undersurface of the door 76 and biases it to swing upward into sealing engagement. Force of the nozzle entering opening 62 compresses the spring and pushes the door down and out of the way for filling. The spring-loaded door arrangement shown in FIG. 8 can also be placed on the top of the reservoir surface with the sealing ring facing down so as to engage the top surface of the reservoir around the opening 62. In this embodiment, the spring 84 and hinge 78 are mounted on the top surface of the reservoir with the spring engaging the top surface of the door 76 and pushing it down. The sealing ring of material (80,82) is mounted on the surface of the door that engages the top of the reservoir and the hinge is mounted between the door and the top surface of the reservoir. In the top-side, spring-biased door embodiments, the user must hold or prop the door open while the reservoir is being filled.

The self-regulation of the watering action is controlled by a hydrophilic sensor 70 shown in FIGS. 1 and 3. The hydrophilic sensor is a porous polyethylene material with average pore size of approximately 20 microns. The sensor is treated with a surfactant to make it hydrophilic. The sensor 70 is permeable to air flow when dry but impermeable to air flow when saturated with moisture. The degree of porosity of the sensor element 70 determines the amount of moisture necessary to saturate the sensor element such that it becomes impermeable to air flow. When air flows through sensor 70 it continues through air tube 72 and air tube port 74 into the fluid reservoir. The air tube port 74 takes the form of a flexible grommet which engages the air tube in an airtight fashion. This airtight fit may be achieved by an interference fit, sealing compound or any other suitable method known in the prior art. In the preferred embodiment, the air tube 72 has a hollow stiffener element 79 inserted in the end of the air tube which engages the air hole 74 which provides rigidity to the otherwise flexible tube at the end thereof to provide rigidity to the tube end coupled to the air space to keep the tube from collapsing on itself under vacuum. This stiffener also stabilizes the outside diameter of the air tube such that it can be deformed slightly because of the elasticity of the flexible tubing used, but cannot be completely collapsed thereby facilitating an airtight interference fit. A suitable stiffener is a short piece of rigid plastic tubing having an outside diameter matching the inside diameter of the tubing or just slightly smaller and having. In the preferred species, another stiffener 77 is inserted into the end of the tube 72 connected to the hydrophilic sensor. The function of stiffener 77 is to provide rigidity to the tube end coupled to the hydrophilic sensor to keep the tube from collapsing on itself under vacuum. In some embodiments where heat shrinkable tubing is used, the stiffener 77 can be eliminated, and the end of the tubing 72 is simply placed over the end of the hydrophilic sensor element and heat from a heat gun is applied to shrink the tubing down to an airtight fit around the end of the hydrophilic sensor. The '815 patent teaches use of heat shrink tubing to couple the air tube to the sensor, but in the genus of the invention this method as well as other methods such a glue or tight interference fits may also be used so long as the permeability to air is not affected. In the preferred species, a stiffener is used in the air tube at the end coupled to the hydrophilic sensor and a short sleeve portion having an inside diameter that matches the outside diameter of the air tube is slid over the end of the tube so as to provide an airtight fit. Sealing material such as glue may be used if necessary. The hydrophilic polyethylene material is then slid into an interference or glued fit into the end of the sleeve.

The function of the stiffeners 79 and 77 could also be performed by metal or rigid plastic tube sections having inside diameter that is just slightly larger than the outside diameter of the plastic tube and which is glued to the tube so as to prevent the tube from collapsing.

Stackability of the planters for shipment or storage is provided by sizing the outside diameter of the bottom of the outer shell to be just slightly smaller than the inside diameter of the top of the inner shell. This way one planter's bottom may be fit into the top of another planter. Jamming is prevented by the provision of inward projecting tabs 80 and 82 in FIG. 3. The top of these tabs is level with the top of the fill plug opening 62 in the fill port 64. This prevents the bottom of the top planter from descending too far into the top of the lower planter.

The hydrophilic sensor 70 is provided with hydrophilic properties by a surfactant and is then sintered to obtain a desired pore size. It is known that when the surfactant is applied before the sintering, the sensor maintains its hydrophilic properties longer. If the surfactant is applied after sintering, the sensor will be rendered hydrophilic and the planter will work. However, the hydrophilic properties do not last nearly as long as in the case where the surfactant is applied before the sintering. The reason for this is not understood by the applicants. Pre-treating with surfactant before sintering allows the hydrophilic properties and surfactant to last up to about 5 years. The hydrophilic sensor can be made simply by applying surfactant after sintering in some embodiments, but then the surfactant will leave in above 6 months requiring the sensor to be replaced. As soon as the surfactant leaves, the sensor is open all the time, and the planter stops automatically watering and waters all the time until the water runs out.

The preferred hydrophilic sensor material is commercially available from GenPore of Reading, Pa. under quote 8022301. Hydrophilic sensor material may also be obtained from Porex in Atlanta, Ga.

The position of the air hole 74 must be selected so as to be above the maximum water level. In the preferred species, shown in FIG. 1, the position of air hole 74 is selected to be above the bottom of the fill hole 62 so as to insure that the water level does not rise above the level of the air hole 74 thereby blocking it. When the soil is dry, the hydrophilic sensor passes air to relieve the vacuum level above the reservoir. This causes water, driven by hydrostatic head pressure, to enter the soil and wick upward driven both by hydrostatic pressure and capillary action until it reaches the sensor 70. When it reaches and saturates the sensor, the air flow stops and water continues to flow only until sufficient vacuum develops to counteract the hydrostatic pressure.

The preferred way to use the planter is to bury the hydrophillic sensor about ⅓ down the root ball of the plant and to pack the soil tightly so that water wicks rapidly through the soil to the sensor. Rapid water movement helps conserve water and lengthen the time between refills of the reservoir and prevents excess water from entering the soil before the sensor shuts off the flow.

A root barrier 90 is used in planters that are to contain aggressive rooted plants to prevent roots from reaching the inlet holes. The root barrier is usually implemented as a 3×3 square inch of fabric dropped into well 24. Roots are water seeking entities and they will grow toward the inlet holes and can block the inlet holes. The root barrier takes the form of a plastic woven fabric with a random weaving pattern an small interstices. There are small time release nodules injection molded onto or welded to the plastic strands that release a non-water soluble herbicide in gaseous form. When roots reach the root barrier, the combination of a physical barrier imposed by the small interstices and the herbicide stop the growth of the root toward the inlet holes. The water insoluble nature of the herbicide keeps it in the region of the root barrier and it is not carried upward with the water to the main root ball. The root barrier fabric is marketed by Reemay Corporation of Old Hickory, Tenn. under the trademark Biobarrier™. The herbicide is commonly referred to as Trifluralin, otherwise known as $\alpha\alpha\alpha$-trifluro-2,6-dinitro-N, N-dipropyl-p-toluidine.

The only barriers that prevent floating material in the reservoir from reaching and blocking the inlet holes is the small space 92 between the bottom wall of the inner shell and the bottom wall of the outer shell. Dimples 94, 96, 98, 100, 102 and 104 in FIG. 3 provide the downward projections shown in cross-section at 108 in FIG. 1. These downward projecting dimples coupled with an upward projecting dimple 106 in the center of the bottom wall of the outer shell provide barriers to free movement of floating or submerged material in suspension toward the inlet ports. More importantly however, these dimples 94, 96, 98, 100, 102 and 104 serve to provide spacers to prevent the bottom 24 of the inner shell from collapsing under the weight of the soil so as to be in flush contact with the bottom 20 of the outer shell. If the two bottoms were to collapse together, the passageway for water in the reservoir to reach the inlet holes would be cut off, and the planter would stop watering. Any form of spacers can be used for this purpose such as washers or plastic blocks glued to the bottom 24 of the inner shell or to the bottom 20 of the outer shell when the material of the inner shell is flexible enough to flex downward under the weight of the soil. Of course, if a material or thickness for the inner shell is selected which is thick enough to not flex under the weight of the soil, it is not necessary to use spacers.

The inner and outer shells can be manufactured using injection molding, rotational molding or any other molding process. Injection molding is fastest and cheapest on a per piece basis for high piece counts, but the tooling is much more expensive than the rotational mold tooling.

Figure 9:
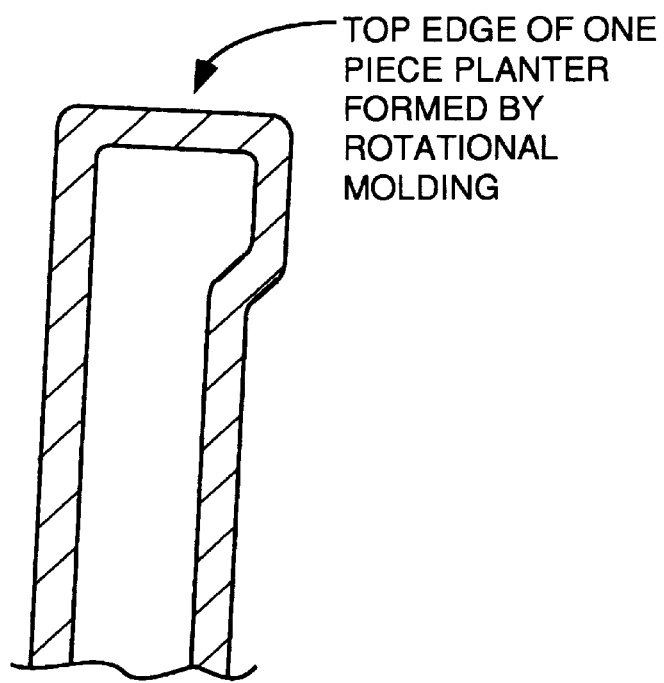
FIG. 9 is a cross-sectional view of the top edge of a one-piece planter reservoir formed by rotational molding.

Prior art rotational molding processes are acceptable to mold planters of the type described herein and have the advantage that the output from the rotational mold is a one-piece unit. FIG. 9 is a cross-section of the top edge of one wall of the planter showing the typical configuration output from a rotational mold. There is no need for a snap fitting between inner and outer shells and no need for a glue bead at the intersection to insure airtight fit because of the one piece construction. To create a one-piece rotationally molded planter, the following steps are performed. First, a tool or die is made that defines the boundaries of the inner and outer shells although in a one-piece product there really are no longer inner and outer shells just inner and outer walls of the wall reservoir. Sometimes the tool is made in 2 or 3 pieces. Then low density polyethylene material in power form is poured into the tool in sufficient quantity to make the piece. The mold pieces are then closed and the entire tool is inserted into a large oven heated to between 400 and 450 degrees F. The tool is rotated in the oven for 10–20 minutes with the actual time depending upon the size of the planter and the atmospheric conditions. The tool is then removed from the oven and rotated while cooling. The mold is then opened and the part is removed. Excess plastic is trimmed. Then water inlet and reservoir fill holes are drilled as are grommet holes and an air hole and parts into the proper holes where appropriate.

Rotational molding is a slower process than injection molding with typical throughput of nine pieces per day. As such, the unit cost to mold the unit is higher but the labor and materials cost to assemble the unit is somewhat lower in that no operation of snapping together the two halves of the planter is required. Further, there is no need to apply a glue bead to the junction to guarantee the seal. The advantage of rotational molding over injection molding is that the initial tooling cost is substantially lower. As a result, rotational molding is preferred for larger, more expensive, lower sales volume planters. If demand starts to exceed supply, it is not as expensive to simply make another tool as it is if injection molding were to be used.

Rotational molding, as is the case for injection molding, is not limited to making round planters. Rectangular and planters of other shapes can also be made. However, for rectangular or other shapes which have flat surfaces, it is sometimes necessary to add stiffening structures or bridges between the walls of the reservoir to enable the self-watering planter to work. The reason for this is that flat walls made of plastic are not as stiff as round walls. Thus, the forces generated by the vacuum when the sensor is saturated with water which would ordinarily hold the water up and prevent any more from seeping into the soil are expended deforming the plastic walls of the reservoir. To prevent this from happening, any stiffening structure which is adequate to prevent deformation of the walls may be used. The preferred way of providing a stiffening structure is to place an insert into the rotational or injection molding tool before the molding process begins. The insert is placed so as to act as stiffening bridge between two opposing walls. During molding, the insert becomes permanently entombed in the plastic thereby forming a stiff bridge of plastic between the walls. Other stiffening structures known in airplane construction such as ribs, stringers etc. may also be formed on the tool or other inserts may be placed into the final molded part through inspection ports formed along the top edge of the reservoir for purposes of placing inserts and then sealed to be airtight after the inserts are placed.

What is claimed is:

1. A self-regulated automatic watering planter having inner and outer shells which snap together to form an airtight reservoir, said inner shell having annular sidewalls which define a container and a top edge having a flange extending outward from said sidewalls in a direction away from the center of said container, said flange having at least two downward projecting annular deformable plastic ridges defining a channel therebetween defined by inner walls of said annular ridges, said inner walls having annular grooves formed therein and wherein said outer shell has a deformable plastic upper edge having annular beads formed on the inner and outer surfaces thereof in a position to engage said grooves when said inner and outer shells are enagaged, said airtight connection being formed by the interference between between said beads and said grooves.

2. The apparatus of claim 1 wherein said self-regulating automatic watering planter includes a hydrophilic sensor made of polyethylene which is coated with a surfactant to make it hydrophilic and then sintered, said sensor plugging one end of an air tube the other end of which is in airtight engagement with an airspace on the top of said airtight reservoir.

3. The apparatus of claim 1 wherein said inner and outer shells include one or more deposits of sealant at the interface therebetween so as to seal both bead-groove engagements to insure the interface is airtight and one or the other of said shells includes a fill port which may be used to fill the reservoir with water and which is structured to receive a stopper to make an airtight seal at the fill port.

4. The apparatus of claim 1 wherein said inner and outer shells include one or more deposits of sealant at the interface therebetween to seal both bead-groove engagements to insure the interface is airtight and wherein one or the other of said shells includes a valved fill port comprised of a passageway with a valve therein which may be manually operated, said passageway used to fill the reservoir with water and which may be closed in airtight fashion by closing said valve.

5. The apparatus of claim 2 wherein said inner and outer shells include one or more deposits of sealant at the bead-groove interfaces to insure the interface is airtight.

6. A planter comprising:

an inner shell having any container shape with a bottom and upstanding sidewalls and having one or more inlet holes formed in the bottom, and having a flange extending outward from the sidewalls in a direction away from the center of the container, said flange having at least two downward projecting annular ridges which may or may not be continuous, said ridges defining a channel therebetween;

an outer shell having a top edge engaged by an interference fit with said inner shell in the channel between said two downward projecting annular ridges, said outer shell having a container shape with a bottom and upstanding sidewalls which is close enough to the container shape of said inner shell such that the space between the inner shell downward projecting ridges can engage an upper edge of said outer shell by a snap fit or interference fit to form a reservoir having at least some fluid storage space between the upstanding sidewalls of said inner and outer shells so as to provide hydrostatic pressure at said inlet holes when said reservoir is filled with fluid, said engagement of said top edge of said outer shell with said channel providing an airtight joint for pressures up to the maximum pressure which would be experienced in normal operation;

means for filling said reservoir but providing an airtight seal when said reservoir is not being filled; and sensor means coupled to an airspace at the top of said reservoir for selectively coupling atmospheric pressure to said airspace depending upon the water content of soil stored in said container formed by said inner shell, and wherein said ridges have inner walls having annular grooves formed therein, and wherein said outer shell has an upper edge having annular beads formed thereon in a position to engage said grooves when said inner and outer shells are engaged so as to provide a snap fit which is airtight.

7. The apparatus of claim 6 further comprising a bead of glue or other sealing agent which seals the junction between said inner and outer shell so as to seal both the bead-groove engagement so as to provide an airtight joint between said inner and outer shells.

8. The apparatus of claim 6 wherein said sensor means comprises an air tube having a hydrophilic polyethylene sensor coupled to one end thereof in airtight fashion, said sensor having an average pore size of 20 microns, the other end of said air tube coupled by an airtight fit through an opening in either said inner or outer shell to an air space above the highest to which the reservoir will be filled with liquid.

9. The apparatus of claim 6 further comprising a sealant imposed between said top edge of said outer shell and said channel.

10. The apparatus of claim 6 further comprising a sealant imposed between said top edge of said outer shell and said channel so as to seal the bead-groove engagement.

11. The apparatus of claim 6 wherein said inlet holes have a venturi-like shape so as to have a wider mouth facing into said reservoir and a narrower outlet through water exits to be driven into soil stored in said planter so as to convert hydrostatic pressure at the mouth of said inlet holes to increased speed of movement of liquid in said reservoir at said narrower outlet.

12. A planter comprising:

an inner shell having any container shape with a bottom and upstanding sidewalls and having one or more inlet holes formed in the bottom thereof, said inlet holes having an outlet aperture through which water exits which has an area which is smaller than the area of a mouth where water enters, and having an annular flange extending outward from the sidewalls in a direction away from the center of the container, said flange having at least two downward projecting annular, deformable ridges which may or may not be continuous, said ridges defining a channel between the inner walls of said two downward projecting annular ridges and wherein said inner walls each have a groove therein;

an outer shell having a deformable top edge having inner and outer surfaces, each of said inner and outer walls having a bead engaged with said grooves in said inner walls of said downward projecting annular ridges of said inner shell by an airtight interference fit, said outer shell also having a container shape with a bottom and upstanding sidewalls, the container shape being substantially the same container shape of said inner shell so as to form a reservoir having at least some fluid storage space between the upstanding sidewalls of said inner and outer shells so as to provide hydrostatic pressure at said inlet holes when said reservoir is filled with fluid, said engagement of said outer shell and inner shell being airtight;

a fill hole in said inner shell used for filling said reservoir, and a stopper for plugging said fill hole for providing an airtight seal when said reservoir is not being filled; and a combination of an air tube having one end coupled by an airtight joint to a hydrophilic polyethylene sensor having a pore size of approximately 20 microns, the other end of said air tube being coupled to an airspace at the top of said reservoir, said sensor and air tube combination for selectively coupling atmospheric pressure to said airspace depending upon the water content of soil stored in said container formed by said inner shell.

13. The apparatus of claim 12 wherein said fill hole is located below the rim of said inner shell.

14. The apparatus of claim 12 wherein said stopper has a screw driven expansion mechanism therein.

15. The apparatus of claim 12 further comprising a root barrier fabric located in the bottom of said inner shell over the location of said inlet holes.

16. The apparatus of claim 12 wherein the dimensions of said inner and outer shell are such that the thickness of the reservoir at the top of the walls is approximately a thickness that allows the reservoir to fit into a decorative planter container.

17. The apparatus of claim 12 wherein the dimensions of the inner and outer shells are such that the planter formed by the engagement of the inner and outer shells fit into decorative planters already in existence that fit self-watering planters where all the water is stored in the bottom below the floor which contains the soil.

18. The apparatus of claim 12 further comprising a plurality of projections extending toward the center of the planter apparatus from the inner wall of the inner shell so as to support the bottom wall of the outer shell of another planter for stackability during shipping.

19. The apparatus of claim 12 wherein the inner and outer shells are plastic, and further comprising spacers between the bottom of the inner shell and the bottom of the outer shell to prevent the bottom of the inner shell from collapsing into flush contact with the bottom of the outer shell so as to cut off the fluid flow passageway between the bottom of the inner shell and the bottom of the outer shell so that water can reach said inlet holes.

20. The apparatus of claim 12 wherein said air tube includes a stiffener at each end to prevent the air tube from collapsing under vacuum pressure.

21. A self-regulated automatic watering planter having inner and outer shells which snap together to form an airtight seam that seals said inner and outer shells together to form a resevoir in the space therebetween, said airtight seam formed by engagement of one or more deformable beads formed on the top edge of said outer shell with one or more deformable grooves formed in a deformable annular channel between two flanges formed around the top edge of said inner shell, said reservoir having a fill hole and a spring-biased door that forms an airtight seal of the fill hole when the reservoir is not being filled.

22. A planter comprising:

an inner shell having any container shape with a bottom and upstanding sidewalls and having one or more inlet holes formed in the bottom, and having a flange extending outward from the sidewalls in a direction away from the center of the container, said flange having at least two downward projecting annular ridges which may or may not be continuous, said ridges defining a channel therebetween;

an outer shell having a top edge engaged by an interference fit with said inner shell in the channel between said two downward projecting annular ridges, said outer shell having a container shape with a bottom and upstanding sidewalls which is close enough to the container shape of said inner shell such that the space between the inner shell downward projecting ridges can engage an upper edge of said outer shell by a snap fit or interference fit to form a reservoir having at least some fluid storage space between the upstanding sidewalls of said inner and outer shells so as to provide hydrostatic pressure at said inlet holes when said reservoir is filled with fluid, said engagement of said top edge of said outer shell with said channel providing an airtight joint for pressures up to the maximum pressure which would be experienced in normal operation;

means for filling said reservoir but providing an airtight seal when said reservoir is not being filled; and sensor means coupled to an airspace at the top of said reservoir for selectively coupling atmospheric pressure to said airspace depending upon the water content of soil stored in said container formed by said inner shell, and wherein said ridges have inner walls having annular grooves formed therein, and wherein said outer shell has an upper edge having annular beads formed thereon in a position to engage said grooves when said inner and outer shells are engaged so as to provide a snap fit which is airtight, and wherein the relative dimensions and placement of said annular grooves relative to the dimensions and placement of said annular beads are such that said bead engage said grooves in an airtight fit when said inner and outer shells are engaged to form said reservoir.

* * * * *